(12) United States Patent
Zach (10) Patent No.: US 11,693,402 B2
(45) Date of Patent: Jul. 4, 2023

(54) FLIGHT MANAGEMENT SYSTEM FOR UAVS

(71) Applicant: LogiCom & Wireless Ltd., Hod Hasharon (IL)

(72) Inventor: Moshe Zach, Hod Hasharon (IL)

(*) Notice: Subject to any disclaimer, the term of this patent is extended or adjusted under 35 U.S.C. 154(b) by 0 days.

(21) Appl. No.: 17/874,015

(22) Filed: Jul. 26, 2022

(65) Prior Publication Data

US 2022/0371734 A1    Nov. 24, 2022

Related U.S. Application Data

(63) Continuation of application No. 17/098,393, filed on Nov. 15, 2020, now Pat. No. 11,449,049, which is a
(Continued)

(51) Int. Cl.
*B64C 39/02*      (2023.01)
*G05D 1/00*      (2006.01)
(Continued)

(52) U.S. Cl.
CPC ......... *G05D 1/0022* (2013.01); *B64C 39/024* (2013.01); *G08G 5/003* (2013.01);
(Continued)

(58) Field of Classification Search
CPC .... G08G 5/0013; G08G 5/003; G08G 5/0034; G08G 5/0043; G08G 5/006;
(Continued)

(56) References Cited

U.S. PATENT DOCUMENTS 6,795,772 B2   9/2004   Lin et al.
6,799,094 B1   9/2004   Vaida et al.
(Continued)

FOREIGN PATENT DOCUMENTS

CN    104071333 A    10/2014
EP      2138921 A2   12/2009

OTHER PUBLICATIONS

International Search Report for PCT/IL2016/050126, dated May 16, 2016.
(Continued)

*Primary Examiner* — Mussa A Shaawat
(74) *Attorney, Agent, or Firm* — The Roy Gross Law Firm, LLC; Roy Gross (57) ABSTRACT

A flight management system for unmanned aerial vehicles (UAVS), in which the UAV is equipped for cellular fourth generation (4G) flight control. The UAV caches on-board a 4G modem, an antenna connected to the modem for providing for downlink wireless RF. A computer is connected to the modem. A 4G infrastructure to support sending via uplink and receiving via downlink from and to the UAV. The infrastructure further includes 4G base stations capable of communicating with the UAV along its flight path. An antenna in the base station is capable of supporting a downlink to the UAV. A control centre accepts navigation related data from the uplink. In addition, the control centre further includes a connection to the 4G Infrastructure for obtaining downlinked data. A computer for calculating location of the UAV using navigation data from the downlink.

43 Claims, 2 Drawing Sheets

Related U.S. Application Data continuation of application No. 16/451,172, filed on Jun. 25, 2019, now Pat. No. 10,877,472, which is a continuation of application No. 15/544,006, filed as application No. PCT/IL2016/050126 on Feb. 3, 2016, now Pat. No. 10,372,122.

(60) Provisional application No. 62/111,764, filed on Feb. 4, 2015.

(51) Int. Cl.
  *G08G 5/00* (2006.01)
  *H04L 12/64* (2006.01)
  *G08G 5/04* (2006.01)

(52) U.S. Cl.
  CPC ............ *G08G 5/006* (2013.01); *G08G 5/0013* (2013.01); *G08G 5/0034* (2013.01); *G08G 5/0043* (2013.01); *G08G 5/0069* (2013.01); *G08G 5/0082* (2013.01); *G08G 5/045* (2013.01); *H04L 12/6418* (2013.01); *B64U 2201/20* (2023.01)

(58) Field of Classification Search
  CPC .... G08G 5/0069; G08G 5/0082; G08G 5/045; G05D 1/0022; H04L 12/6418; B64C 2201/146
  See application file for complete search history.

(56) References Cited

U.S. PATENT DOCUMENTS

| | | | |
|---|---|---|---|
| 6,820,006 B2 | 11/2004 | Patera | |
| 6,873,903 B2 | 3/2005 | Baiada et al. | |
| RE39,053 E | 4/2006 | Rees | |
| 7,024,309 B2* | 4/2006 | Doane | B64C 13/18 |
| | | | 701/120 |
| 7,194,353 B1* | 3/2007 | Baldwin | G08G 5/0039 |
| | | | 701/528 |
| 7,212,917 B2 | 5/2007 | Wilson, Jr. | |
| 7,306,187 B2 | 12/2007 | Lavan | |
| 7,492,307 B2* | 2/2009 | Coulmeau | G08G 5/0021 |
| | | | 342/29 |
| 7,516,014 B2* | 4/2009 | Hammarlund | G08G 5/0008 |
| | | | 340/961 |
| 7,630,829 B2 | 12/2009 | Pepitone | |
| 8,060,295 B2* | 11/2011 | Estkowski | G08G 5/0013 |
| | | | 340/961 |
| 8,909,391 B1* | 12/2014 | Peeters | G05D 1/0027 |
| | | | 709/201 |
| 9,864,372 B2 | 1/2018 | Chen et al. | |
| 2002/0152029 A1 | 10/2002 | Sainthuile et al. | |
| 2003/0122701 A1 | 7/2003 | Tran | |
| 2003/0193409 A1 | 10/2003 | Crank | |
| 2004/0078136 A1 | 4/2004 | Cornell et al. | |
| 2004/0193362 A1 | 9/2004 | Baiada et al. | |
| 2005/0156777 A1 | 7/2005 | King et al. | |
| 2006/0021880 A1* | 2/2006 | Sandoval | C25C 7/02 |
| | | | 205/576 |
| 2006/0184292 A1* | 8/2006 | Appleby | F41H 13/00 |
| | | | 701/2 |
| 2006/0224318 A1 | 10/2006 | Wilson, Jr. et al. | |
| 2007/0078600 A1 | 4/2007 | Fregene et al. | |
| 2007/0106473 A1* | 5/2007 | Bodin | G01C 23/00 |
| | | | 701/3 |
| 2007/0150127 A1 | 6/2007 | Wilson, Jr. et al. | |
| 2009/0247204 A1* | 10/2009 | Sennett | H04W 16/14 |
| | | | 455/512 |
| 2010/0121574 A1* | 5/2010 | Ariyur | G08G 5/0021 |
| | | | 701/301 |
| 2014/0018979 A1* | 1/2014 | Goossen | G06Q 10/047 |
| | | | 701/3 |
| 2016/0266579 A1* | 9/2016 | Chen | G06V 20/176 |

OTHER PUBLICATIONS

SA Written Opinion for PCT/IL2016/050126, dated May 16, 2016.
International Preliminary Report on Patentability for PCT/IL2016/050126, completed Jul. 13, 2017.

* cited by examiner

FLIGHT MANAGEMENT SYSTEM FOR UAVS

CROSS-REFERENCE TO RELATED APPLICATIONS

This application is a continuation of U.S. patent application Ser. No. 17/098,393, filed Nov. 15, 2020, which is a continuation of U.S. patent application Ser. No. 16/451,172, filed on Jun. 25, 2019, now U.S. Pat. No. 10,877,472, which is a continuation of U.S. patent application Ser. No. 15/544,006 filed on Jul. 16, 2017, now U.S. Pat. No. 10,372,122, which is a National Phase of PCT Patent Application No. PCT/IL2016/050126, having International filing date of Feb. 3, 2016, which claims the benefit of priority of U.S. Provisional Patent Application No. 62/111,764, filed Feb. 4, 2014, the contents of which are all incorporated herein by reference in their entirety.

TECHNICAL FIELD

The present invention is in the field of aviation control. More specifically, the control of unmanned aviation vehicle flight and cellular networks.

BACKGROUND ART

The usage of UAVs is growing steadily. Mission spectrum is wide and keeps widening, a typical list of missions includes: reconnaissance, military targeting and attack, fire control, and parcel delivery. Currently commercial UAVs require special wireless links to control their flight, each suck link may not be geographically sufficient to cover the entire flight path, rather, it provides for a limited section of the path. Typically only a few miles are supported by the link, usually requiring line sight to the UAV.

While the UAV typically communicates with a wireless ground stations, the human controller is connected to ground stations via a ground network. If the ground station is part of a nationwide system of control stations that coordinate with each other, there is a possibility of a smooth handover of UAV from one ground station to the next. An alternative scenario is that a controller directly communicating with the UAV via a wireless link.

An issue associated with UAV flight control, is the lack or lesser interaction of these aerial vehicles with the general flight control. The weight of UAVs is often less than 25 kgs, and for this and various other reasons their tracking by many radar systems in not facilitated. This not only indicates a lack of possibility to control flight using common tracking systems but the hazard that such vehicles pose to civilian, military air traffic, other UAVs and objects on the ground through actual collision or otherwise intervention in flight courses.

DISCLOSURE OF THE INVENTION

Figure 1:
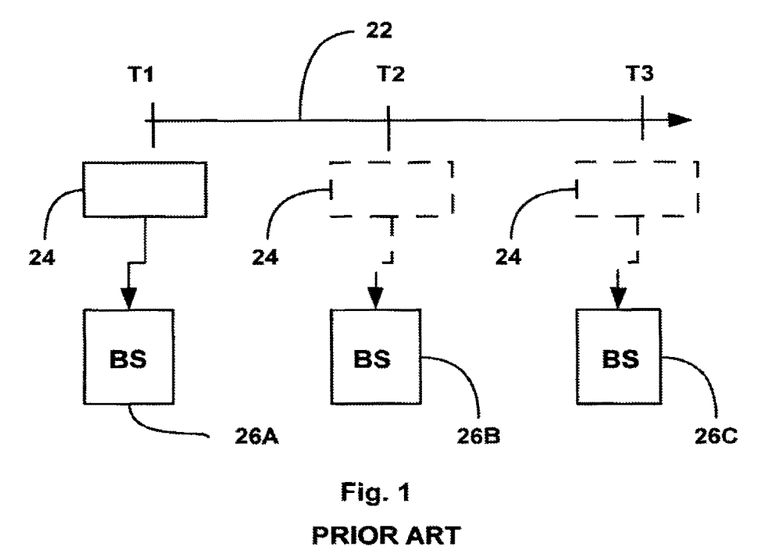
FIG. 1 is a schematic diagram of a general flight path with ground station support.

As the bottleneck in UAV communications (uplink and downlink) is the struggle for bandwidth, it is maintained that the deployment and use of generation 4.0 (known as 4G) and above is to provide a viable data link for UAV flight path control and optionally additional tasks. 4G infrastructure is now being implemented worldwide.

in accordance with the present invention, a UAV flies along a flight path while using the cellular 4G infrastructure to implement the mission control. As can be seen in FIG. 1, flight path 22 which also represents a time line is the path along which UAV 24 flies or is intended to fly at time T1, T2 and T3. At T1 base station (BS) 26A intercommunicates with UAV 24, at time T2 BS 26B replaces 26B and at time T3 BS 26C replaces 26B. In comparison with control system of the prior art, the BSs attending to the flight control of the UVA in accordance with the present invention, come in lieu of the customary ground stations.

Figure 2:
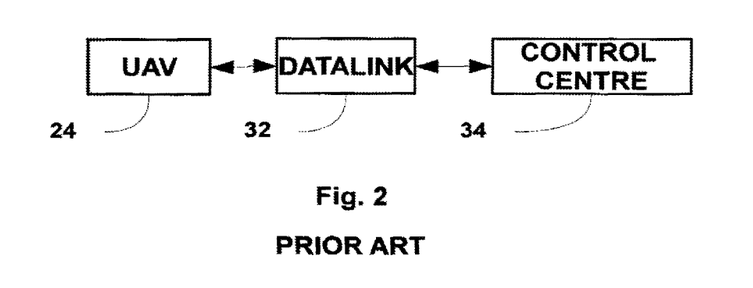
FIG. 2 is a schematic diagram of a UAV with data link.

The complete data path is shown schematically FIG. 2. UAV 24 uses data link 32 to connect with flight control centre 34. The data link in accordance with the present invention is embodied in 4G infrastructure employing compatible modems on the UAV.

Minimal Network Properties Required

In order to fulfill the task in accordance with the present invention, cellular infrastructure of the $4^{th}$ generation (known also as 4G) and above is used to provide the date link to the UAV. Properties of the 4G system are defined by ITU's International Mobile Telecommunications Advanced program (IMT-Advanced program). The ITU stands for international Telecommunication Union, which is an agency of the UN.

On—Board H/W Components of a UAV accommodated for Mission

Figure 3:
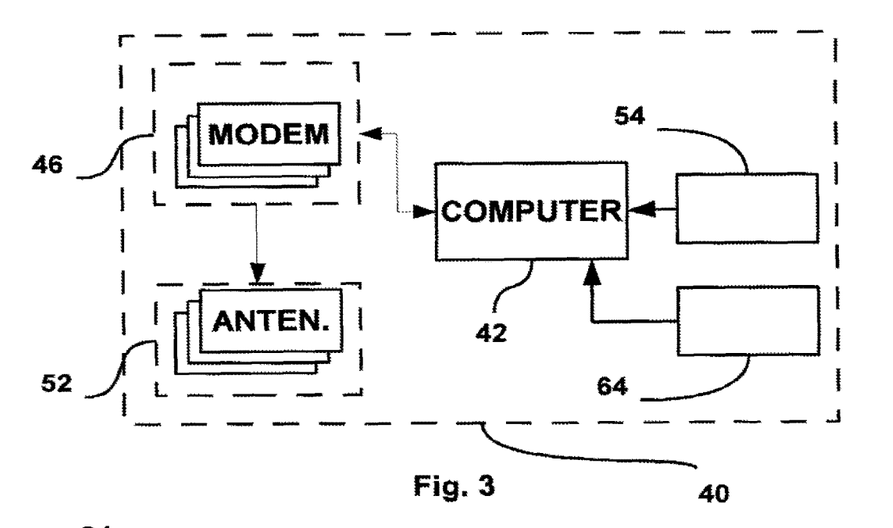
FIG. 3 is a schematic description of the major components with which a UAV for implementing the present invention is equipped.

Schematically shown in FIG. 3, UAV 40 carries on board computer 42 connected to one or more cellular modems 46, these modems are operational with 4G cellular network. An example of 4G modem is Netgear AT&T Aircard 34OU 4G USM which is an LTE (long term evolution) modern. To these one or more modems, one or more cellular antennae 52 are connected, to provide RF to the downlink and/or as uplink receiving antennae for each of the modems. Box 54 represents hardware payload elements, typically sensors that provide navigational information to be downlinked to the flight control centre. LTE advanced and Mobile Wimax communication standards are considered as complying with the 4G requirements. Navigational information derived from on-board inertial sensors (gyroscopes end accelerometers) can be used to navigate the UAV in case of a total failure of the supporting cellular network, or a failure in receiving data from the GPS satellites. Navigational information can be derived from the signal of the supporting cellular network, which may be very important if signal from the GPS satellites is insufficient. The cellular network can identify the location of the UAV as by at least two base stations and as "triangulation" algorithm in order to provide the location of the UAV.

Providing for UAV Related Uplink and Downlink Data

In order to control the UAV in its flight path, downlink is required to send commands and flight parameters to the UAV. In the other direction, uplink data is transmitted to the control centre to provide navigation related data collected in the UAV, and which is relevant for the analysis of the compliance of the UAV with the path. Such data is for example, telemetry, GPS data collected by on-board GPS receiver and on-board inertial data, these are represented by box 4. The collected data all or part of the collected data from the sensors can be uploaded to the internet cloud as IoT (Internet of Things) data. The uplink and downlink data from or to the UAV can be sent to more than one end point. Such data as payload data as video stream that is sent from the UAV camera or data as the UAV flight parameters data can be sent to more than one end point via the 4G infrastructures to different working stations or even to personal devices as Smart phones, tablets (with 4G modems) directly or indirectly and simultaneously, in the other direction, it is possible that the driving control and fight management of the UAV can be done in parallel from different End Points of the 4G infrastructures but coordinated between the UAV remote pilots so in definite moment only one is the main UAV remote pilot that actually drives the UAV. For example more than one person can drive and control the UAV at specific time but at any moment the UAV driving control can be switched to a different person connected to different end point, receiving the same flight parameters and other payload data of the UAV simultaneously.

UAV Payload Data and Uplink for Transmitting Same

In addition to the control and flight management, another aspect of the present invention is to do with a payload uplink, specifically not associated with the data related to the flight management. The uplinked data of this category relates to another aspect of the present invention, implemented through the 4G infrastructure discussed above. Box 64 represents hardware payload elements, typically sensors that provide information to control centre 34 or to another data collecting facility. An inconclusive list of such sensors include optionally video camera/s, thermal IR camera/s (known also as FLIR), and RADAR. Other sensors which may be of use are thermometers, pressure gages, humidity gages and other meteorological and other environmental sensors. Payload data from such sensors can be loaded to the internet cloud for various data analysis agencies while the UAV is on mission or after, BS and On-Board Antennae BS antennae are typically Omni-directional. However for the sake of the purpose described in the present disclosure, directional antenna can be used to point at some angle upwards.

The adaptation of the UAV to the implementation of cellular networks connectivity includes the on-board antennae as well. In order to extend the effective distance of a UAV from the cellular BS, two types of antennae can be used in a complementary manner which will be described below. The two types of antennae in this case are omni-directional antenna and unidirectional antenna.

In this aspect of the invention, the omni-directional antenna can be used to search for the strongest emitting antenna of a BS. After detection of the strongest antenna, the unidirectional antenna can be directed to the same antenna in order to acquire the signal from same antenna.

The unidirectional antenna then locks on the direction of the cellular BS antenna so the higher gain of the unidirectional antenna enables the detection of weaker signals and by that extend the UAV range from the BS.

This aspect of the invention can contribute to the quality of service (QoS) with respect to the UAV. This aspect of the invention is expected to increase the QoS in problematic locations for example where a BS is at a suboptimal distance, and in places in which BS is of poor coverage and in general where the received signal is weak.

The omni directional antenna can continuously search for alternative BSs signals. Thus, if a signal has become weak or lost altogether, rendering the unidirectional antenna ineffective, the omni-directional antenna is switched back to keep the connection with the wireless link albeit a different BS, providing a better signal, A Plurality of SIM (Subscriber Identity Module) Cards In another aspect of the present invention, the one or more modems on-board the UAV may contain each one or more SIM cards. This enables the UAV to shift from one to another cellular network in order to increase the robustness of the communications system. Moreover, it becomes possible for the UAV to use a plurality of networks at once thereby increasing effective bandwidth.

Quality of Service for the UAV

Flight control traffic for UAVs over 4G, must have ensured bandwidth and network access. There are several supporting measures that can be taken in order to keep the QoS above a defined threshold. One such measure is discussed above with respect to the use of two antenna types. One other measure is discussed below in the context of an auxiliary UAV. Another measure is the implementation of a virtual mobile network. similar to the MVNO (mobile virtual network operator) also known as Molo (mobile other licensed operator), in which the infrastructure, typically BS are licensed to an operator other than the proprietor of the infrastructure. Such technological/legal operative, it would be practical to allocate a portion of the infrastructure use to a UAV operator under agreement, in which case the QoS would be more under control of the UAV operator. By definition such a virtual network operator may dedicate the network solely for the use in accordance with the present invention. Another aspect of supporting measures for the flight/mission is discussed below under the header of flight plan below.

In order to use the frequencies bandwidth optimally in the cellular infrastructures including the base stations, the system is to dynamically allocate the bandwidth of the cellular network and its base station. For example if there is a demand for additional bandwidth for confirmed UAVs flight plans, more of the frequencies bandwidth will be dedicated for the UAVs network with a lesser frequencies bandwidth being allocated for the primarily mobile phone wireless network. Such a dynamic allocation of the frequencies bandwidth can be managed as by the cellular infrastructures management system.

Participation of More Than One UAV in a Mission

In addition to the UAV carrying out a certain mission, other UAVs may be involved in the same mission. An auxiliary UAV (AUAV) may be employed to extend the cellular network participating in the mission. For example, a AUAV can carry on-board the amount of H/W required for creating a microcell, the AUAV may assist in the UAV providing the mission, to extend geographical limitations of the cellular system interacting with the UAV, or in keeping a QoS definitions in control, essentially as the microcell created by the AUAV is to serve the UAV exclusively. The notion of picocel in this mintext is theoretically possible but then the two UAVs will have to keep very close in order for the connections to take place.

Flight Plan

Since this term has formal connotations, as a formal plan presented to the flight control authorities by the flier of a plane, the term is used hereinafter in a more loose sense than is usually used in the context of flight formalities. Thus, the intended course of a mission, from a geographical point of view of a UAV in accordance with the present invention, draws a geographically based scheme of flight in all three dimensional aspects of the spare. The flight plan in accordance with the present invention takes into consideration not only the course of the planned mission in geographical coordinates and flight altitude along the route, but also the availability of BSs along the routes, service providers deployed along the proposed plan, and alternatives. In such a plan, the possibility of employing an AUAV for specific sections of the plan is state in order to increase extent of service, overcome blockage or reduction in reception quality of the cellular network, etc. The consequences of the flight plan on the QoS are such that on sections of the flight plan there may be more BSs available, then in other sections. The availability of more than one cellular infrastructure along the path, may be used to prefer a specific service provider along the way, thereby switching between SIM cards available on-board the UAV, either applying a preplanned move or by an on flight decision. Further, different bandwidth requirements along the flight path may be planned ahead and be integrated in the flight plan. For example if the flight plan includes a video acquisition term from one point to another point, the bandwidth for the downlink at the specific limits is to cover the bandwidth allocation requirements at the stage.

The system may confirm the requested flight course after confirming and consider the local flight authorities regulations requested by the submitted the flight program according to the regulations and other UAVs expected and confirmed flights and after checking and verifying that the flight requested program is in allowed airspaces.

The confirmed flight plan and path in the 3D space and time can be downloaded by the 4G downlink to the UAV to be accepted by the on-board computer for further pressing to control the UAV flight. This can be managed by the FDCDS (discussed below) as well. The flight control according to the downloaded flight plan can be then thieved for example by an on-board autopilot or by the remote pilot which may be a person who drives remotely the UAV.

Implementation of the current invention can increase safety of flight for large number of simultaneously flying UAVs, as well as for human life and safety of property on the ground since the availability of the UAVs flight parameters via the same payload wireless link implemented by the 4G cellular modem and link and the relatively easy addition capability of supervising and control of the UAVs that is proposed by the current concept and invention. There is no known current wireless network that is especially advantageous and able to support all the benefits as can be provided by the implementation of the current invention.

A flight data collection and distribution server (FDCDS) constitutes another aspect of the invention. The data sources and distribution targets of the server, ate described schematically with reference to FIG. 4. FDCDS 82 interacts with subscribing UAVs 84, with subscribing air planes 86, with participation 4G cellular providers 88 and with aerial traffic control authorities (ATC) 90. The interaction with the UAVs 84, acre planes 86 and cellular network providers has a strong on-line aspect as they may be involved with on-going missions. The involvement with control centre 34 and ATC 94) has more off-line aspects. The purpose of having an active FDCDS is to monitor struggle over bandwidth, facilitate better planning of flight missions and prevent collisions. The FDCDS can be used as a major tool in the implementation of aerial flight control.

Figure 4:
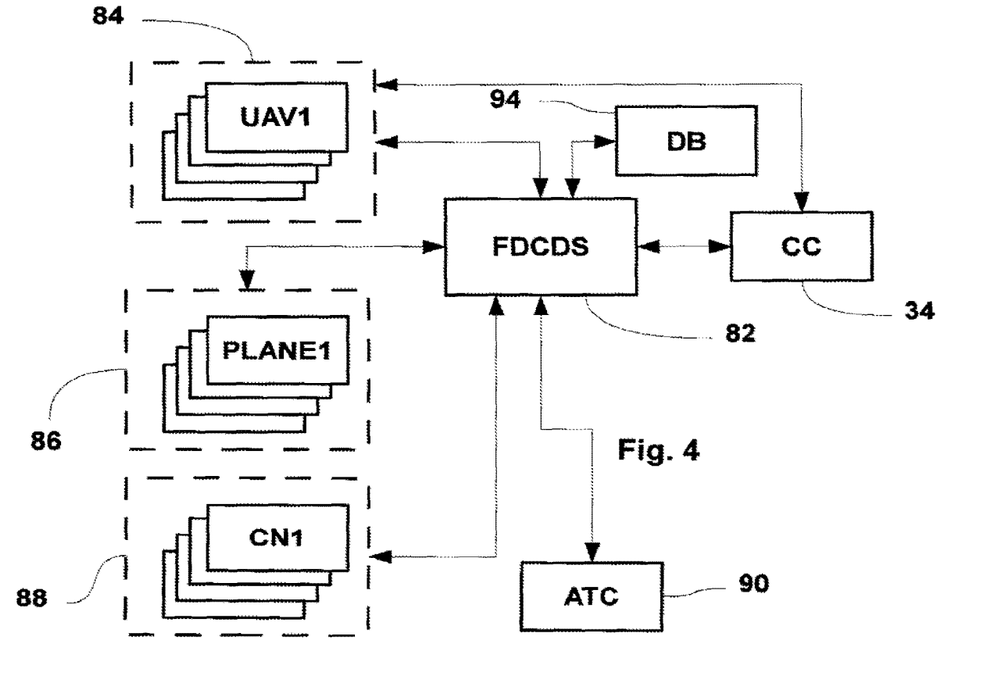
FIG. 4 is a schematic diagram showing the interconnection of flight data collection and distribution saver.

The data about flight missions of UAVs, stored and constantly updated in database 94 can be used as a planning tool to select best flight plans. In case the FDCDS detects that a UAV is out of its confirmed flight path, in the dimensional space, the FDCDS can assume control thereby setting the UAV in the original flight path. The FDCDS can also confirm or react request for flight. plan. In case the flight plan is confirmed by the FDCDS, the FDCDS can download to the UAV the con ed flight plan and flight path including the 3D path, and reference to time. The flight plan may be downloaded by the 4G structure downlink to the on-board computer, Alternatively the UAV may rive just a confirmation number if the flight plan is already downloaded.

In a similar attitude to various levels of autopilot controlling flight parameters, the FDCDS can in cooperation with on board computer 42 can assume control of rudder, ailerons, elevators, and the engine. Another practical option is the use of a standard purchased autopilot unit so the driving control data for the flight driving control channels as for the rudder, ailerons, elevators, and the engine. The connection of the cellular modem to such autopilot unit can enable stable and accurate flight track in various weather conditions. The flight driving control channel between the cellular modem mounted in the UAV can interface and/or use standard protocols for remote control for platforms as standard S.BUS serial data protocol or any other standard serial data wireless link protocol for remote control of platforms, Other Autonomous Vehicles.

Although the disclosure referred to hereinabove to UAVs should understood that the system of the invention can be applied to other autonomous vehicles, more specifically to autonomous land vehicles and autonomous boats. With the exception that there is usually no need to implement altitude references in earth-bound missions, or at least much less in term of altitude is to take place.

Use of the System of the Invention in the Managing of UAV Fleets.

The idea of using fleets of UAVs in regular haulage and dispatch missions is gaining momentum and is expected to become prevalent. The FDCDS of the present invention lends itself easily to managing such fleet together with keeping track of the consignments. The use of data relating to the flight missions obtained from a plurality of UAVs and using data from other sources such as weather models, facilitates the dynamic assignment of flight plans that can provide minimal dispatching time of parcels by UAVs of the fleets. Moreover, such plans can be dynamically calculated in-flight for optimization.

Integrative Computer on Board the UAV

As mentioned already above, computer 42 is connected to the modems and does its share in the communications of the UAV the cellular infrastructure. In addition, the same computer can be employed in the task of maneuvering the UAV by controlling the motors of the devices that direct the flight (ailerons etc.) and also it can control the power output of the propulsion engine to change the thrust, for example by controlling the fuel supply. The same computer can be implemented in the control of the various sensors including cameras on-board the UVA.

Flight Supervision

The supervision, control and management of flight in accordance with the present invention, preferably uses the FDCDS 82, may tack each flight since location speed and other navigation data can become available if it is connected via the same cellular infrastructure then in case of out of course. The system can prevent deviation from an authorized course by sending limitation commands to the UAV specifically in case of risks of entrance to forbidden airspaces. To perform such supervision, automatic or non automatic, use is made of UAV telemetry and flight parameters such air and ground speed, altitude, measured on board the UAV, location by GPS and other flight parameters. The UAV uplink data sent via the 4G infrastructures may include also relevant information as left fuel or left electrical energy in the battery of the UAV in order to enable efficient and safe UAV flights.

In case of risk of physical danger to a supervised UAV that may caused by another UAV, the system can alert about the risk by sending flight driving commands in order to prevent the contention, automatically or by the human operator of the UAV or by the UAVs flight supervision and control system.

A new flight plan can be requested and confirmed during other flight plan as when there is a need to change the flight course during flight. Such supervision and control may enable in real time priority for UAVs that are in a mission of emergency services by sending alerts and other flight instructions in real time to other UAVs. Such supervision and control system may increase safety in the air and on the ground and can enable automatic by computerized and/or by human supervision as well while supplying and recording of each UAV flight details including location, speed, height, direction and other vital flight data.

The invention claimed is:

1. A system for controlling and management of a plurality of vehicles over a cellular network, the system comprising:
   a first location sensor for sensing and producing a first geographical location data;
   a first aerial vehicle that comprises the first location sensor, the first aerial vehicle being configured to transmit the first geographical location data over the cellular network, or to receive over the cellular network messages that include first control commands, and to execute control commands or warning commands;
   a second location sensor for sensing and producing a second geographical location data;
   a second aerial vehicle that comprises the second location sensor and is configured to transmit the second geographical location data over the cellular network, or to receive over the cellular network messages that include second control commands, and to execute the second control commands; and
   a server computer device configured to receive and store the first and the second geographical location data, and to provide and transmit at least part of the messages over the cellular network based on the first and the second geographical location data received from the first and the second aerial vehicles over the cellular network,
   wherein the cellular network uses, or is compatible with, a standard Fourth-Generation (4G) or a Long-Term-Evolution (LTE) network that provides promised data rate, promised latency, ensured connection reliability, Quality-of-Service, QoS, or any combination thereof, and
   wherein each of the first and the second aerial vehicles directly interacts with the same server computer device over the cellular network using a respective direct link that provides promised data rate, provides promised latency, uses an allocated bandwidth, or any combination thereof.

2. The system of claim 1, wherein the cellular network supports a data rate of at least 42 Mb/s per link.

3. The system of claim 1, wherein at least one of the first and the second aerial vehicles is uniquely identified by a first and a second identifier, respectively, and
   wherein at least one of the first and the second aerial vehicles is configured to transmit to the server computer device over the direct link in the cellular network.

4. The system of claim 1, wherein the system is for use with at least one of a first and a second respective flight plans that comprises a three-dimensional route defined by altitude and geographical coordinates or course,
   wherein at least one of the first and the second flight plans is stored in one of the first and the second aerial vehicles respectively, and
   wherein at least one of the first and the second aerial vehicles is configured to follow the stored respective flight plans.

5. The system of claim 4, wherein at least one of the respective flight plans of the first and the second aerial vehicles is stored in the server computer device, and wherein the server computer device is configured to transmit at least one of the flight plans to the respective aerial vehicles over the cellular network to be stored thereon.

6. The system of claim 5, wherein the server computer device is configured to communicate with an Aerial Traffic Control (ATC) authority, and wherein the server computer device is configured to transmit the respective flight plan to at least one of the first and the second aerial vehicles in response to receiving an approval to the flight plan from Aerial Traffic Control (ATC) authority.

7. The system of claim 4, wherein the server computer device is configured for comparing at least one of the first and the second geographical location data with the respective flight plan, and for providing and transmitting alert messages or control commands to at least one of the respective aerial vehicle over the cellular network in response to detecting risk of entrance to forbidden or limited airspace.

8. The system of claim 7, wherein the server computer, is configured to provide and transmit control commands from the server computer device over the cellular network, to direct at least one of the first and the second aerial vehicles according to the respective flight plan,
   wherein the at least one of the first and the second aerial vehicles, further comprises a rudder, ailerons, elevators, a propulsion engine or motor or any combination of thereof, that is at least in part responsive to the respective control commands received over the cellular network from the server computer device,
   wherein the server computer device is configured for comparing at least one of the first and the second geographical location data with the respective flight plan, and for producing and transmitting alert messages or control commands to at least one of the first and the second aerial vehicles over the cellular network in response to the comparison.

9. The system of claim 4, wherein the system is for use with a first and second updated flight plan respectively,
   wherein the server computer device is configured to transmit at least one of the first and the second updated flight plans to the respective first and the second aerial vehicles over the cellular network to be stored thereon while executing the flight plan.

10. The system of claim 3 wherein the cellular network uses first and second base stations (BSs) respectively located at first and second locations, and
    wherein at least one of the first and the second flight plans is based on the first and second locations so that the communication with the server computer device is via the first BS in a first part of the flight plan and with the second BS in a second part of the flight plan.

11. The system of claim 1, wherein at least one of the first and the second aerial vehicles comprises, or consists of, an Unmanned Aerial Vehicle (UAV).

12. The system of claim 1, wherein the first aerial vehicle further comprises a first antenna and a first modem coupled to the first antenna of the first aerial vehicle for transmitting to, and receiving from, the cellular network, and wherein the second aerial vehicle further comprises a first antenna and a first modem coupled to the first antenna of the second aerial vehicle for transmitting to, and receiving from, the cellular network.

13. The system of claim 12, wherein the first aerial vehicle further comprises a second antenna and a second modem coupled to the second antenna of the said first aerial vehicle, and wherein the second aerial vehicle comprises an second antenna and a second modem coupled to the second antenna of the said second aerial vehicle for transmitting to, and receiving from, the cellular network, wherein the first and second modems of each of the said first aerial vehicle and the second aerial vehicle are connected for extending bandwidth or redundancy, or wherein the first antenna comprises an omnidirectional antenna, and wherein the second antenna comprises a unidirectional antenna.

14. The system according to claim 13, wherein at least one of the first and the second aerial vehicles is configured to search and identify BS based on a signal strength from the identified BS, wherein at least one of the first and the second aerial vehicles is configured to direct the unidirectional antenna to the identified BS, wherein at least one of the first and the second aerial vehicles is configured to search and identify an additional BS in response to a signal strength from the identified BS received by the omnidirectional antenna, or wherein at least one of the first and the second aerial vehicles is configured to search and identify an additional BS in response to a signal strength from the identified BS received by the unidirectional antenna.

15. The system of claim 12, wherein at least one of the first and the second aerial vehicles further comprises a Subscriber Identity Module (SIM) for subscriber access to the cellular network, or wherein at least one of the first and the second aerial vehicles comprises a second antenna and a second modem coupled to the second antenna of each of the said aerial vehicles for transmitting to, and receiving from, an additional cellular network.

16. The system of claim 15, wherein the aerial vehicle further comprises a Subscriber Identity Module (SIM) for subscriber access to the additional cellular network, wherein at least one of the first and the second aerial vehicles, is configured to simultaneously communicate over the cellular network and the additional cellular network, or wherein at least one of the first and the second aerial vehicles, is configured to shift communication from the cellular network to the additional cellular network.

17. The system of claim 1, wherein each of the first and the second aerial vehicles is uniquely identified by an identifier, and wherein at least one of the first and the second aerial vehicles is further configured for uploading the first and the second geographical location data and the first and the second identifier respectively to an Internet cloud.

18. The aerial vehicles according to claim 1, wherein the at least one of the first and the second geographical location data comprises navigational information, ground speed, altitude, directions, or any combination thereof, wherein at least one of the first and the second location sensor comprises a gyroscope, an accelerometer or an inertial sensor, wherein at least one of the first and the second location sensor comprises a Global Positioning System (GPS) sensor, wherein at least one of the first and the second geographical location data is based on triangulation of signals received from at least two base stations of the cellular network, wherein at least one the of first and the second aerial vehicles further comprises a first and a second autopilot respectively that is configured for executing a respective flight plan by using the first and the second geographical location data, wherein at least one of the first and the second aerial vehicles, comprises a first and a second additional sensor respectively for sensing and providing a sensor data, and wherein at least one of the first and the second aerial vehicles is configured to transmit the first and the second additional sensor data respectively to the server computer device or to a working station, over the cellular network, wherein at least one of the first and the second additional sensors comprises a camera, wherein the camera is a still, a video, a thermal InfraRed (IR), a FLIR camera, or any combination of thereof, wherein the at least one of the first and the second additional sensors comprises a RADAR, wherein the at least one of the first and the second additional sensors, comprises a meteorological sensor, or an environmental sensor, wherein the meteorological or the environmental sensor, comprises a thermometer, a pressure gauge, a humidity gauge or any combination of thereof, wherein at least one of the first and the second additional sensors, comprises a fuel level, a battery energy level or any combination of thereof, wherein at least one of the first and the second additional sensor data, comprises a fuel level or a battery energy level or any combination of thereof, wherein at least one of the first and the second additional sensor data, comprises an image or video data an image or video data, wherein the system comprises an additional computer device, and wherein at least one of the first and the second aerial vehicles is further configured to transmit the respective additional sensor data to the respective additional computer device over the cellular network, or wherein the system, further is configured for uploading at least one of the first and the second sensor data to the Internet cloud.

19. The system of claim 1, further comprising a first or a second human-operated computer device, wherein at least one of the first and the second aerial vehicles is configured to directly transmit the first and the second geographical location data to the first or the second human-operated computer device over the cellular network, wherein at least one of the first and the second aerial vehicles is configured to simultaneously receive from the server computer device and from the first and the second human-operated computer device, wherein the at least one of the first and the second human-operated computer device comprises a smartphone, a tablet, or a personal device, wherein at least one of the first and the second aerial vehicle is configured to receive and execute control commands that include driving commands from the first or the second human-operated computer device over the cellular network, or wherein at least one of the first and the second aerial vehicles is further configured to simultaneously receive from the server computer device and from the first or the second human-operated computer device, at different times.

20. The system of claim 19, wherein the system further comprises an additional computer device, and wherein at least one of the first and the second aerial vehicles is configured to directly transmit the first and the second geographical location data to the additional computer device over the cellular network, and to receive and execute control commands that include driving commands from the first and the second additional computer device over the cellular network, or wherein the first and the second aerial vehicles is configured to receive and execute in real-time control commands that include driving commands from the additional computer device and from the first or the second human-operated computer device at different times.

21. The system of claim 1, wherein the cellular network provides promised data rate, promised latency, ensured connection reliability, Quality of Service (QoS) or any combination of thereof.

22. The system of claim 1, wherein the cellular network comprises an uplink for communication from at least one of the first and the second aerial vehicles to the server computer device and downlink for communication from the server computer device to the respective aerial vehicle, and wherein the direct link uses a shared, public licensed mobile operator, or allocated link using Quality of Service (QoS).

23. The system of claim 22, wherein the ensured bandwidth is provided by a Mobile Virtual Network Operator (MVNO) Mobile Other Licensed Operator (Molo), or wherein the ensured bandwidth or the dedicated link is dynamically managed and allocated.

24. The system of claim 1, wherein the Fourth Generation (4G) network is according to, or compatible with, International Telecommunication Union (ITU) International Mobile Telecommunications Advanced (IMT-Advanced) program, or wherein the Fourth Generation (4G) technology is according to, or compatible with, Mobile WiMax standard.

25. The system of claim 1, further comprising an additional aerial vehicle that is configured for communicating with at least one of the first and the second aerial vehicles and the cellular network for extending the cellular network geographical coverage.

26. The system of claim 1, wherein the additional aerial vehicle comprises a micro-cell of the cellular network.

27. The system of claim 1, wherein the server computer device is ground-station based, wherein the server computer device is a part of, or comprises, a Flight Data Collection and Distribution Server (FDCDS), wherein the server computer device is configured to communicate with at least one airplane, with a cellular network provider, with a weather model provider, or any combination thereof, wherein the server computer device is configured to communicate with an Aerial Traffic Control (ATC) authority, or wherein the server computer device is configured to communicate in real-time with an airplane, with a cellular network provider, or any combination thereof.

28. A method for controlling and management of plurality of aerial vehicles by a server computer device over a cellular network, the method comprising:

receiving first location geographical data, by the server computer device from a first aerial vehicle over the cellular network;

storing, in the server computer device, the received first geographical location data; and receiving second location geographical data, by the same server computer device from a second aerial vehicle over the cellular network;

storing, in the same server computer device, the received second geographical location data; and providing and transmitting, by the same server computer device directly to the first and the second aerial vehicles over the cellular network, messages based on the received geographical location data respectively;

wherein the cellular network uses, or is compatible with, a standard Fourth-Generation 4G), or a Long-Term-Evolution (LTE) network is according to, or compatible with, International Telecommunication Union (ITU) International Mobile Telecommunications Advanced (IMT-Advanced) program, that provides promised data rate, promised latency, ensured connection reliability, Quality-of-Service (QoS), or any combination thereof, and wherein the server computer device directly interacts with each of the first and second aerial vehicles the over the cellular network using a respective direct link that provides promised data rate, provides promised latency, uses an allocated bandwidth, or any combination thereof, or wherein the first and the second aerial vehicles are uniquely identified by a first and a second identifier respectively, the method further comprises receiving messages and commands, by the same server computer device from the first and the second aerial vehicles over the cellular network.

29. The method of claim 28, wherein the server computer device is ground-station based, wherein the server computer device is part of, or comprises, a Flight Data Collection and Distribution Server (FDCDS), wherein the method, further comprising communicating, by the server computer device, with at least one airplane, with a cellular network provider, with a weather model provider, or any combination thereof, wherein the method, further comprises communicating, by the server computer device, communicate with an Aerial Traffic Control (ATC) authority, or wherein the method, further comprises communicating in real-time, by the server computer device, with an airplane, with a cellular network provider, or any combination thereof.

30. The method of claim 28, wherein at least one of the first and the second aerial vehicles comprises, or consists of, an Unmanned Aerial Vehicle (UAV).

31. The method of claim 28, further comprising storing, by the server computer device, at least one of the first and the second flight plan that comprises a three-dimensional route defined by altitude and geographical coordinates or course,
wherein the method, further comprises transmitting, by the server computer device to at least one of the first and the second aerial vehicles over the cellular network, the first and the second flight plan to be stored thereon.

32. The method according to claim 31, wherein the method, further comprises
comparing, by the server computer device, at least one of the first and the second geographical location data with the first and the second flight plan; and
providing and transmitting, by the server computer device to at least one of the first and the second aerial vehicles over the cellular network, control commands in response to detecting risk of entrance to forbidden or limited airspace; or
wherein the method, further comprises:
communicating, by the server computer device, with an Aerial Traffic Control (ATC) authority; and
transmitting, by the server computer device to the Aerial Traffic Control (ATC) authority, at least one of the first and the second flight plans, wherein the transmitting, by the server computer device to the first and the second aerial vehicles over the cellular network, of the respective flight plan is in response to receiving an approval to at least one of the first and the second flight plans from the ATC authority.

33. The method of claim 32, wherein the method, further comprises providing and transmitting, by the server computer device to at least one of the first and the second the aerial vehicles over the cellular network, control commands to direct the first and the second aerial vehicles according to the first and the second flight plans,
wherein the control commands direct or control a rudder, ailerons, elevators, a propulsion engine or motor or any combination of thereof, in at least one of the first and the second respective aerial vehicles.

34. The method of claim 31, wherein the method is for use with a first and a second updated flight plans, the method further comprises transmitting, by the server computer device to at least one of first and the second aerial vehicles over the cellular network while executing the first and the second flight plans, the first and the second updated flight plans to be stored thereon, or
wherein the cellular network uses first and second base stations (BSs) respectively located at first and second locations, and wherein at least one of the first and the second flight plans is based on the first and second locations so that the communication with the device is via the first BS in a first part of the flight plan and with the second BS in a second part of the flight plan.

35. The method of claim 28, wherein at least one of the first and the second geographical location data comprises navigational information, ground speed, altitude, directions, or any combination thereof,
wherein at least one of the first and the second aerial vehicles is configured for uploading the first and the second geographical location data and the first and the second identifier to the Internet cloud,
wherein at least one of the first and the second aerial vehicles further comprises a first and a second additional sensor for sensing and producing a first and a second sensor data, the method further comprising receiving, by the server computer device from the first and the second aerial vehicles over the cellular network,
wherein at least one of the first and the second additional sensors data comprises an image or video data, or a fuel level data or a battery energy level data,
wherein at least one of the first and the second additional sensors comprises a first and a second camera,
wherein at least one of the first and the second cameras comprises a thermal InfraRed (IR), a FLIR, a still or a video camera or any combination of thereof,
wherein at least one of the first and the second additional sensors comprises a RADAR,
wherein at least one of the first and the second additional sensors is a meteorological sensor or an environmental sensor, a thermometer, a pressure gauge, a humidity gauge or any combination of thereof,
or wherein at least one of the first and the second sensors data comprises a fuel level or a battery energy level.

36. A first and a second aerial vehicle for communication with a server computer device over a cellular network,
the first aerial vehicle comprises:
a first location sensor for sensing and producing a first geographical location data; and
a first antenna, and a first modem coupled to the first antenna of the first aerial vehicle, for transmitting to, and receiving from, the server computer device over the cellular network;
the second aerial vehicle comprises:
a second location sensor for sensing and producing a second geographical location data; and
an antenna, and a modem coupled to the antenna of the second aerial vehicle, for transmitting to, and receiving from, the server computer device over the cellular network;
wherein each of the first and the second aerial vehicles are uniquely identified by an identifier,
wherein each of the first and the second aerial vehicles are configured to transmit, over the cellular network to the same server computer device, each of the first and the second geographical location data and each of the first and the second identifiers, or
is configured to receive, over the cellular network from the same server computer device, messages that include alerts or control commands according to the first and the second aerial vehicle geographical locations, and to execute the control commands of the first and the second aerial vehicles; and
wherein the cellular network uses, or is compatible with, a standard Fourth-Generation (4G) or a Long-Term-Evolution (LTE) network, that provides promised data rate, promised latency, ensured connection reliability, Quality-of-Service (QoS), or any combination thereof, and
wherein the first and the second aerial vehicles directly interact with the same server computer device over the cellular network using a direct link that provides promised data rate, provides promised latency, uses an allocated bandwidth, or any combination thereof.

37. The aerial vehicles of claim 36, wherein at least one of the first and the second aerial vehicles further comprises, or consists of, an Unmanned Aerial Vehicle (UAV).

38. The aerial vehicles of claim 36, wherein the first and the second aerial vehicles further comprises a second antenna of each of the aerial vehicles and a second modem coupled to the second antenna of each of the aerial vehicles for transmitting to, and receiving from, the cellular network, wherein the first and second modems are connected for extending bandwidth or redundancy, or wherein the first antenna comprises an omnidirectional antenna, and wherein the second antenna comprises a unidirectional antenna, wherein at least one of the first and the second aerial vehicles, is configured to search and identify BS based on a signal strength from the identified BS, wherein at least one of the first and the second aerial vehicles is configured to direct the unidirectional antenna to the identified BS, or wherein at least one of the first and the second aerial vehicles, is further configured to search and identify an additional BS in response to a signal strength from the identified BS received by the first and the second respective unidirectional antenna.

39. The aerial vehicles of claim 38, further comprising a first and a second Subscriber Identity Module (SIM) for subscriber access to the additional cellular network, wherein at least one of the first and the second aerial vehicles, is configured to simultaneously communicate over the cellular network and additional cellular network, or wherein at least one of the first and the second aerial vehicles comprises a second antenna and a second modem coupled to the second antenna of each of the aerial vehicles for transmitting to, and receiving from, an additional cellular network or further configured to simultaneously communicate over the cellular network and additional cellular network.

40. The aerial vehicles of claim 38, wherein at least one of the first and second aerial vehicles further configured to shift communication from the cellular network to the additional cellular network, wherein at least one of the first and the second aerial vehicles, is further configured for uploading the first and the second geographical location data and the first and the second identifiers respectively to the Internet cloud.

41. The aerial vehicles of claim 36, wherein at least one of the first and the second location data comprises navigational information, ground speed, altitude, directions, or any combination thereof.

42. The aerial vehicles of claim 41, wherein at least one of the first and the second location sensors comprises a gyroscope, an accelerometer, or an inertial sensor or any combination of thereof, wherein at least one of the first and the second location sensors comprises a Global Positioning System (GPS) sensor, wherein at least one of the first and the second location data is based on triangulation of signals received from at least two base stations of the cellular network, or wherein at least one of the first and the second aerial vehicles, further comprising first and a second autopilot that is configured for executing a first and a second flight plans by using the first and the second geographical location data.

43. The aerial vehicles of claim 42, wherein the at least one of first and the second aerial vehicles, further comprises a first and a second additional sensors for sensing and producing a sensor data, and wherein the at least one of the first and the second aerial vehicles is further configured to transmit the sensor data to the same server computer device over the cellular network, wherein at least one of the sensors data comprises an image or video data, or a fuel level data or a battery energy level data or any combination of thereof, wherein the at least one of the additional sensors comprises a camera, wherein the camera comprises a still or video a thermal InfraRed (IR), a FLIR Camera, or any combination of thereof, wherein at least one of the additional sensors comprises a RADAR, or wherein at least one of the additional sensors is a meteorological sensor or an environmental sensor or a thermometer or a pressure gauge or a humidity gauge or any combination of thereof.

* * * * *